Nov. 4, 1930. D. F. McGOVERN Re. 17,853.

POLISHING WHEEL

Original Filed March 20, 1924 2 Sheets-Sheet 1

Inventor
Daniel F. McGovern
By Attorney

Nov. 4, 1930. D. F. McGOVERN Re. 17,853

POLISHING WHEEL

Original Filed March 20, 1924 2 Sheets-Sheet 2

Inventor
Daniel F. McGovern
By Ellis Spear Jr.
Attorney

Reissued Nov. 4, 1930

Re. 17,853

UNITED STATES PATENT OFFICE

DANIEL FREDRICK McGOVERN, OF MONTPELIER, VERMONT

POLISHING WHEEL

Original No. 1,565,746, dated December 15, 1925, Serial No. 700,721, filed March 20, 1924. Application for reissue filed April 8, 1927. Serial No. 182,141.

This invention relates to polishing or ironing wheels, and involves certain improvements over my prior patent Reissue No. 15,245, granted December 6, 1921.

Although the wheel of my said reissue patent was particularly intended for use in hand machines, it has been found very satisfactory in the smaller sizes thereof up to say a wheel thirty-eight inches in diameter when used in a power machine. The development of the power machines, however, has called for larger sizes of wheels and difficulty has been experienced in adapting the larger sizes of my said patented wheel for use in power machines. This has been due to the inability of the patented wheel in larger sizes to utilize the abrasive under the increased diameter and greater speed of power machines. Where there is an unequal distribution of abrasive, the efficiency of the cutting action of the wheel is reduced and the time required for polishing is increased.

To the end therefore of producing a polishing wheel in sizes particularly adapted for power machines, but which may also be used for hand polishing, I have devised my present invention. In it, I provide for the more complete utilization of the larger abrasive capacity of the large wheels as compared with my smaller patented wheel and with consequent increase in cutting efficiency. Moreover, I practically double the cutting action of the wheel by so re-arranging the segmental flanges thereof as to not only provide an increased internal abrasive distribution for the wheel but to insure adequate utilization of the abrasive drawn in at the several peripheral intake openings of the wheel through the feed channels thereof so that the abrasive is effectively distributed across the entire working face of the wheel.

Choking of the channels at their narrowing discharge ends is prevented by sub-dividing the flanges into a plurality of substantially sector shaped flange sets, each set being spaced sufficiently apart from the next adjacent sets so as to provide generally radial throats or aisles along which the abrasive discharging from one flange set may be transferred inwardly across the face of the wheel into the next following flange set. The sector shaped flange sets are eccentric to the axis of rotation of the wheel so that the flanges of one set do not accurately track those of the preceding set but catch the abrasive as it redistributes itself in the aisles between the groups.

The construction and operation of my wheel, together with selected embodiments which well illustrate the principles involved and are in themselves forms found satisfactory in use, are described and shown in the accompanying specification and drawings, and the characteristic features of novelty are particularly pointed out in the appended claim. Throughout the specification and drawings like reference characters are correspondingly applied, and in the drawings:

I have indicated generally at 1 the plate or disc of the polishing wheel, at 2 the central mud discharge opening thereof, and at 3 the attaching lugs which receive the driving shaft.

Figure 1:
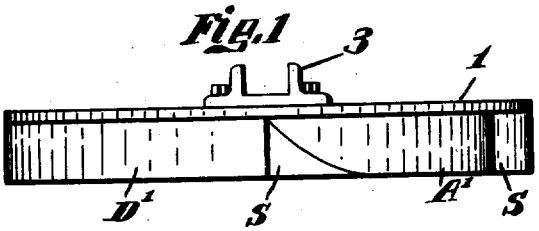
Fig. 1 is a side elevation of one form of polishing wheel in accordance with my invention.
Figure 2:
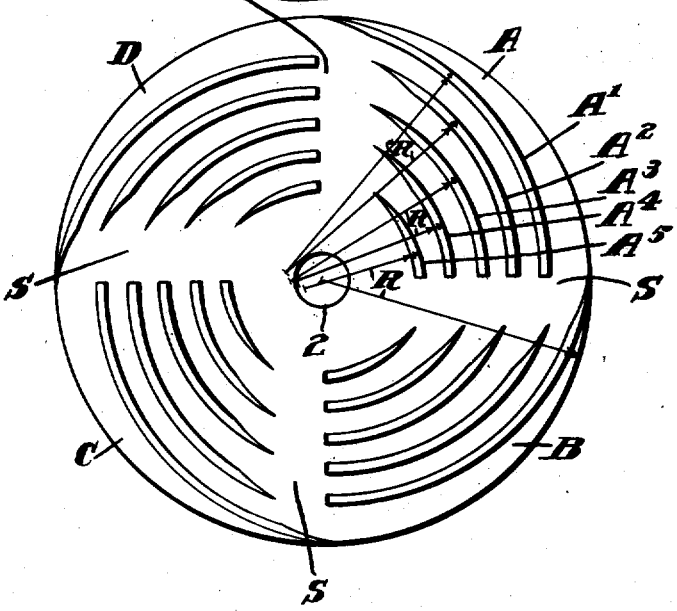
Fig. 2 is a face view thereof.
Figure 3:
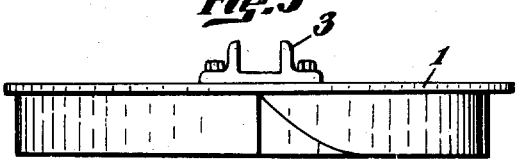
Figs. 3 and 4 are corresponding views of a modification.
Figure 4:
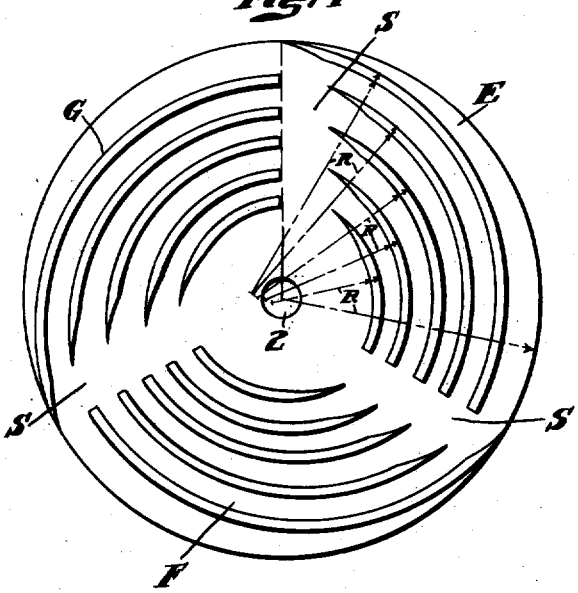

In the form of my invention shown in Figs. 1 and 2, the working face of the disc 1 is provided with a plurality of segmental flanges arranged in the form of four spaced sector shaped flange sets as indicated A, B, C and D, and in the form of my invention shown in Figs. 3 and 4, there are only three sector shaped flange sets, as indicated at E, F and G.

In both forms the flange sets are symmetrically arranged over the working face of the wheel, the flanges of each group being substantially concentric to each other but each flange set being slightly eccentric to the axis of rotation of the wheel. The flanges of each group are duplicates of the corresponding flanges in any other group so that the flanges may be interchangeably applied to the wheel and the spaces or aisles S separating the flanges of one group from those of the next flange group are relatively staggered as to each other so that the abrasive discharging thereinto from a preceding flange set may redistribute itself before it is taken up by the next following flange group.

The individual flanges of each flange group are developed on the same relative curvature, but the centers from which the flanges in said group are struck as arcs of a circle are shifted progressively closer to the geometrical center of the disc 1 as the flanges approach said center. This is indicated diagrammatically in Fig. 2 by the several radius lines R.

The outermost or leader flange of each set starts at the periphery of the disc 1 and overlaps the adjacent aisle or space S. The included flanges $A^2$, $A^3$, $A^4$, and $A^5$, of the set A start at points in rear of the leader flange $A^1$ but in the same general plane as to each of the flange sets.

The abrasive drawn into the flange sets by the leader flanges at what may be called the peripheral intake openings of the wheel passes through the feed channels defined by the flanges and discharges into the spaces S separating the respective sets of flanges. These spaces permit a redistribution of the abrasive so that it may be taken up by the next following set of flanges and progressively worked towards the center of the disc. The eccentric arrangement of flange sets disposes the leading ends of the flanges of of one set slightly offset to the heel ends of the flanges of the preceding set so that the flanges do not accurately track each other.

In Figs. 3 and 4 the flange arrangement is similar to that shown in Figs. 1 and 2 except that the working face of the wheel is subdivided into only three groups of flanges instead of into four groups as shown in Fig. 2.

Various other modifications in the construction and arrangement of the flange sets may obviously be resorted to within the limits of the appended claim.

What I therefore claim and desire to secure by Letters Patent is:

A polishing wheel, comprising a disc having on its working face groups of segmental flanges, each flange group being circularly spaced from the next adjacent flange groups, and said spaces constituting aisles extending radially from adjacent the center of the disc to the tips of the outermost flanges of said groups, and the tips of the outermost flanges of such groups starting at substantially the periphery of the disc and overlapping the outer ends of said aisles, the included flanges of each group all starting at spaced points in substantially the same plane and all the flanges of each group, including the outermost flange thereof, terminating in substantially the same plane.

In testimony whereof I affix my signature.

DANIEL FREDRICK McGOVERN.